A. P. TABER.
BATTERY BOX.
APPLICATION FILED JUNE 6, 1922.

1,434,321. Patented Oct. 31, 1922.

WITNESSES

INVENTOR
Arthur P. Taber
BY
ATTORNEYS

Patented Oct. 31, 1922.

1,434,321

UNITED STATES PATENT OFFICE.

ARTHUR PRATT TABER, OF RED WING, MINNESOTA.

BATTERY BOX.

Application filed June 6, 1922. Serial No. 566,314.

*To all whom it may concern:*

Be it known that I, ARTHUR P. TABER, a citizen of the United States, and a resident of Red Wing, in the county of Goodhue and State of Minnesota, have invented a new and Improved Battery Box, of which the following is a full, clear, and exact description.

This invention relates to improvements in B batteries, and more particularly to B batteries adapted for use in connection with radio and the like, an object of the invention being to provide an improved construction and arrangement of battery box and cover with devices in the cover for moving the positive and negative terminals of the cells into contact.

A further object is to provide a battery of the character described, in which the cells can be replaced at small cost and by an amateur so that the expense of the battery can be reduced to a minimum.

With these and other objects in view, the invention consists in certain novel features of construction and combinations, and arrangement of parts, as will be more fully hereinafter described and pointed out in the claims.

In the accompanying drawings—

Figure 1:
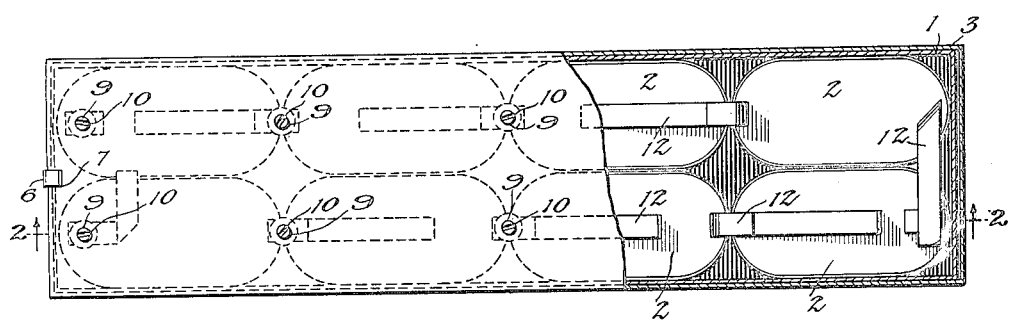
Figure 1 is a plan view of my improved battery partly in section.
Figure 2:
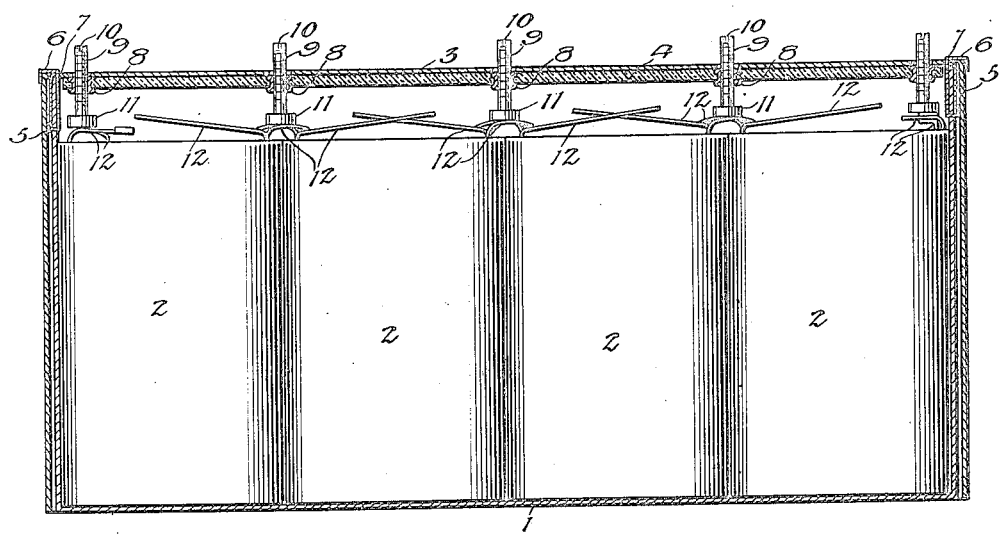
Figure 2 is a view in vertical section on the line 2—2, of Figure 1.

1 represents my improved battery box which may of course, contain any number of battery cells 2, although I have shown eight of these cells which I deem a preferable number for ordinary radio use. 3 represents the cover of my improved box, which is telescoped upon and fits the box 2, and is provided with a re-inforcing sheet 4 which is preferably of fiber. The upper ends of the box 1 have metal clips 5 secured thereto, these clips 5 are preferably of sheet metal and are clamped to the wall of the box and are provided with bendable tongues 6, which are projected through slot 7 in the top 3 and are then bent down and around the edge, or corner, of the cover to securely clamp the cover on the box.

The sheet 4 is provided with internally screw threaded rivets 8 which are preferably of fiber and which receive adjusting screws 9, the upper ends of which latter are made with screw driver receiving grooves 10 to facilitate the adjustment of the screws.

The inner ends of the screws 9 are enlarged as shown at 11 and adapted to engage the terminals 12 of the cells 2, it being noted that the positive and negative terminals of the cells overlap so that the screws serve to force the terminals together and close the electric circuit between the cells.

In the event one of the cells becomes exhausted it can be easily and cheaply replaced by purchasing a new cell and the amateur can cheaply replenish cells, or re-arrange cells as he may desire.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A battery box of the character described, comprising a box or receptacle, a cover on the box having slots therein, metal clips secured to the box, bendable tongues on the clips projected through the slots in the cover and bent against the cover securing the cover on the box, and contact closing screws supported by the cover.

2. A battery box of the character described, comprising a box or receptacle, a cover on the box having slots therein, metal clips secured to the box, bendable tongues on the clips projected through the slots in the cover and bent against the cover securing the cover on the box, a reinforcing sheet of insulating material in the cover, internally screw threaded rivets in the sheet, screws projecting through the sheet and cover and having screw driver receiving grooves in their outer ends, and enlargements on the inner ends of the screws adapted to close contacts of cells within the box.

3. A battery box of the character described comprising a box or receptacle, a cover on the box, devices on the box securing the cover thereon, a reinforcing sheet of insulating material in the cover, internally screw threaded devices in the sheet, screws projecting through the sheet and cover, and enlargements on the inner ends of the screws adapted to close contacts of cells within the box.

ARTHUR PRATT TABER.